(12) United States Patent
Wee et al.

(10) Patent No.: US 12,235,937 B2
(45) Date of Patent: Feb. 25, 2025

(54) OBFUSCATION OF EXECUTABLE INSTRUCTION SETS FOR ENHANCED SECURITY

(71) Applicant: NTT RESEARCH INC., Sunnyvale, CA (US)

(72) Inventors: Hoeteck Wee, Sunnyvale, CA (US); Daniel Wichs, Brookline, MA (US)

(73) Assignee: NTT RESEARCH INC., Sunnyvale, CA (US)

( * ) Notice: Subject to any disclaimer, the term of this patent is extended or adjusted under 35 U.S.C. 154(b) by 251 days.

(21) Appl. No.: 18/043,033

(22) PCT Filed: Aug. 26, 2021

(86) PCT No.: PCT/US2021/047785
§ 371 (c)(1),
(2) Date: Feb. 26, 2023

(87) PCT Pub. No.: WO2022/047055
PCT Pub. Date: Mar. 3, 2022

(65) Prior Publication Data
US 2023/0315821 A1 Oct. 5, 2023

Related U.S. Application Data

(60) Provisional application No. 63/071,348, filed on Aug. 27, 2020.

(51) Int. Cl.
*G06F 21/14* (2013.01)
*G06F 21/64* (2013.01)

(52) U.S. Cl.
CPC .............. *G06F 21/14* (2013.01); *G06F 21/64* (2013.01)

(58) Field of Classification Search
CPC .......... G06F 21/14; G06F 21/64; G06F 21/12; H04L 63/0428; H04L 2209/16
See application file for complete search history.

(56) References Cited

U.S. PATENT DOCUMENTS

| | | | |
|---|---|---|---|
| 11,017,319 B1 * | 5/2021 | Kim | G06F 21/14 |
| 2017/0033933 A1 * | 2/2017 | Haber | G06F 16/93 |
| 2017/0033934 A1 * | 2/2017 | Camenisch | H04L 9/3263 |
| 2018/0173589 A1 * | 6/2018 | Chang | G06F 21/6218 |
| 2018/0337899 A1 * | 11/2018 | Becker | H04L 9/0852 |
| 2020/0099665 A1 * | 3/2020 | Herzberg | G06F 21/53 |
| 2021/0034736 A1 * | 2/2021 | Mitchell | H04L 9/50 |

FOREIGN PATENT DOCUMENTS

WO WO-2019126044 A1 * 6/2019 ............. G06F 21/12

OTHER PUBLICATIONS

Garg, Sanjam, et al. "Candidate indistinguishability obfuscation and functional encryption for all circuits." SIAM Journal on Computing 45.3 (2016): 882-929. (Year: 2016).*

* cited by examiner

*Primary Examiner* — Malcolm Cribbs
(74) *Attorney, Agent, or Firm* — CipherLaw

(57) ABSTRACT

The invention relates to systems, methods, network devices, and machine-readable media for creating obfuscated computer-executable instructions to enhance security. The invention can receive a set of non-obfuscated executable instructions corresponding to a program, and using a functional encoding primitive comprising an encoding process, an opening process, and a decoding process, generate a set of obfuscated instructions which can then be provided to a relatively insecure environment.

18 Claims, 4 Drawing Sheets

OBFUSCATION OF EXECUTABLE INSTRUCTION SETS FOR ENHANCED SECURITY

CROSS-REFERENCE TO RELATED APPLICATIONS

This application is a national stage application, filed under 35 U.S.C. § 371, of International Patent Application No. PCT/US2021/047785, filed Aug. 26, 2021, which claims the benefit of U.S. Provisional Application No. 63/071,348 filed Aug. 27, 2020, the contents of both of which are hereby incorporated in their entireties.

FIELD OF THE INVENTION

The present disclosure relates to systems, methods, network devices, and machine-readable media for securing a set of computer-executable instructions by obfuscation while preserving functionality.

BACKGROUND OF THE INVENTION

Indistinguishability obfuscation (iO) is a probabilistic polynomial-time algorithm $\mathcal{O}$ that takes as input a circuit C and outputs an (obfuscated) circuit C'=$\mathcal{O}$(C) satisfying two properties: (a) functionality: C and C' compute the same function; and (b) security: for any two circuits $C_1$ and $C_2$ that compute the same function (and have the same size), $\mathcal{O}(C_1)$ and $\mathcal{O}(C_2)$ are computationally indistinguishable. Since the first candidate for iO was introduced, a series of works have shown that iO would have a huge impact on cryptography.

Known iO candidates with concrete instantiations may be broadly classified as follows. First, we have fairly simple and direct candidates based on graded "multi-linear" encodings and that achieve plausible post-quantum security. These candidates have survived fairly intense scrutiny from cryptanalysts, and several of them are also provably secure in restricted adversarial models that capture a large class of known attacks. However, none of these candidates have a security reduction to a simple, falsifiable assumption.

Next, we have a line of works that aims to base iO on a conjunction of simple and well-founded assumptions culminating in recent work basing iO on pairings, LWE, LPN and PRG in NCO. These constructions rely on the prior constructions of iO from functional encryption (FE), and proceed to build FE via a series of delicate and complex reductions, drawing upon techniques from a large body of works, including pairing-based FE for quadratic functions, lattice-based fully-homomorphic and attribute-based encryption, homomorphic secret-sharing, as well as hardness amplification.

Other efforts include more recent and incomparable candidates, including a direct candidate based on tensor products and another based on affine determinant programs (with noise), a candidate based on an interplay between a LWE-based and a DCR-based cryptosystems, and the plausibly post-quantum secure candidates that replace the use of pairings in the second line of works with direct candidates for FE for inner product plus noise. All of these candidates, as with the first line of work, do not present a security reduction to a simple, falsifiable assumption.

None of these existing approaches yields a lattice-inspired iO candidate that is plausibly post-quantum secure and enjoys a security reduction under a simple, falsifiable assumption referring solely to lattice-based cryptosystems. There is a need for an iO candidate whose hardness distills to a single source of computational hardness (as opposed to lattice plus pairing/number-theoretic hardness). Such a candidate is also potentially more amenable to crypto-analytic efforts as well as further research to reduce security to more standard lattice problems.

BRIEF SUMMARY OF THE INVENTION

Some embodiments of the invention include systems and methods for securing a set of executable instructions by obfuscation by receiving a set of non-obfuscated executable instructions corresponding to a program whose input comprises a value in the set $\{1, \ldots, N\}$; using a functional encoding primitive comprising an encoding process, an opening process and a decoding process to compute obfuscated instructions by: executing the encoding process of the functional encoding primitive to encode the executable instructions; computing Q=sqrt(N) functions, each of which functions correspond to evaluating the executable instructions on a set of m=sqrt(N) distinct input values; executing the opening process for each of the functions; storing outputs of the encoding process and the opening process as a set of obfuscated instructions; and storing the set of obfuscated executable instructions on a computerized storage device for subsequent execution, wherein the set of obfuscated executable instructions satisfy properties of: functionality whereby the set of obfuscated executable instructions and the set of non-obfuscated executable instructions compute the same function and have the same input-output behavior; and security whereby for any two sets of non-obfuscated executable instructions with the same input-output behavior of the set of non-obfuscated executable instructions, the corresponding set of obfuscated executable instructions cannot be distinguished by a computationally efficient process.

Further embodiments comprise executing the obfuscated instructions of a program on an input x in the set $\{1, \ldots, N\}$ by: finding an index i in $\{1, \ldots, Q\}$ of a function that corresponds to an evaluation of the program on x; and executing a decoding process on the obfuscated executable instructions and the $i^{th}$ opening to recover an output of de-obfuscated instructions.

In further embodiments, the functional encoding primitive further comprises: a commitment primitive comprising a commit process, an evaluation process and an open process; a sampler primitive comprising an initialize process and a sample process; and wherein the encode, open, decode processes of the functional encoding primitive further comprise encoding by: executing a commitment process; executing a sampler initialization process; opening by: executing a commitment evaluation process; executing a sampling process of the sampler; summing up the sample and the evaluated commitment resulting in a commitment c; providing an opening for the commitment c; decoding by: executing a commitment evaluation process; executing a sampling process of the sampler; summing up the sample and the evaluated commitment resulting in a commitment c; and using the provided opening for c to recover a committed value.

In further embodiments, the commit, evaluate, and open processes of the commitment primitive use a learning with errors sample plus a committed value to generate an opening smaller than the committed value. In further embodiments, the initialization and sampling processes of the sampler primitive further comprises: initializing by executing a commitment process on a key k for a pseudorandom function resulting in a commitment c; and sampling by executing a commitment evaluation process to generate a pseudorandom learning with errors sample from the key k. In further embodiments, the obfuscated instructions represent a proprietary algorithm for providing a security function in a mobile hardware environment, and further comprising distributing the stored obfuscated instructions to a remote platform comprising the mobile hardware environment. In further embodiments, the mobile hardware environment comprises a secure coprocessor that further comprises a hardware-based key manager, which is isolated from a main processor for the mobile hardware environment. In further embodiments, the obfuscated instructions represent one or more components of an operating system for the mobile hardware environment. In further embodiments, the obfuscated instructions perform a function of verifying one or more of components of an operating system for the mobile hardware environment. In further embodiments, the obfuscated instructions represent one or more application programming interfaces which are exposed for outside access. Further embodiments comprise combining multiple instances of the obfuscation process together using a tree-like compression process to create an obfuscated program, wherein execution of the obfuscated program on a computerized processor runs in polynomial time.

BRIEF DESCRIPTION OF THE DRAWINGS

The accompanying drawings, which are included to provide further understanding and are incorporated in and constitute a part of this specification, illustrate disclosed embodiments, and together with the description, serve to explain the principles of the disclosed embodiments. In the drawings.

DETAILED DESCRIPTION

Figure 1:
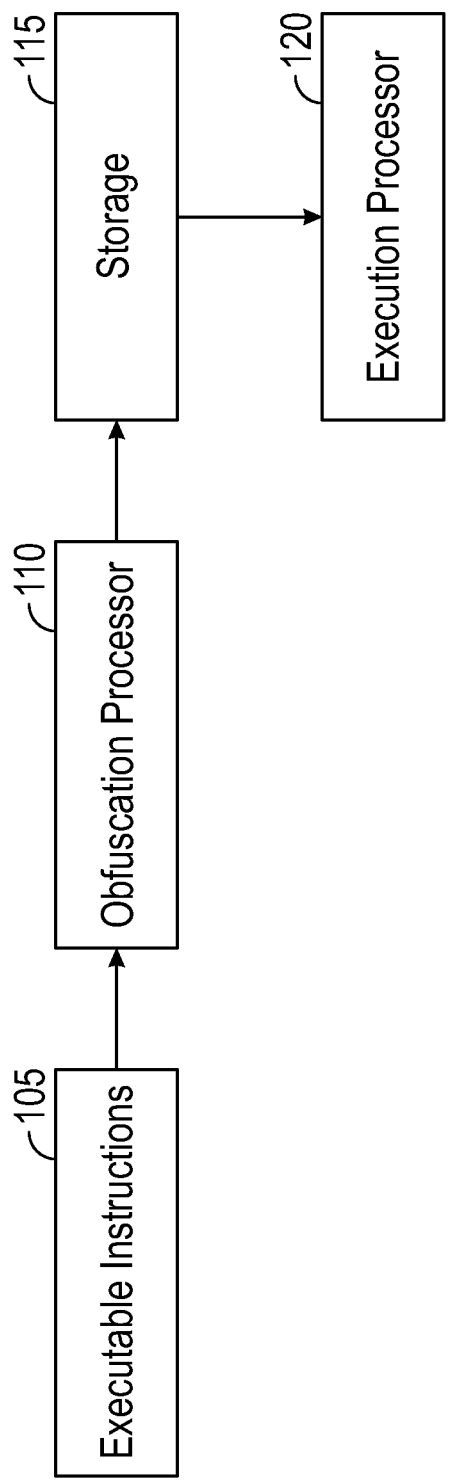
FIG. 1 illustrates an example system for securing a set of instructions by obfuscation.

Described herein is a new, simple candidate construction of indistinguishability obfuscation (iO). Our scheme is inspired by lattices and learning-with-errors (LWE) techniques. We formulate a new falsifiable assumption under which the scheme is secure. Furthermore, the scheme plausibly achieves post-quantum security.

As a first step, we construct an iO scheme that is provably secure assuming that LWE holds and that it is possible to obliviously generate LWE samples without knowing the corresponding secrets. We define a precise notion of oblivious LWE sampling that suffices for the construction. It is known how to obliviously sample from any distribution (in a very strong sense) using iO, and our result provides a converse, showing that the ability to obliviously sample from the specific LWE distribution (in a much weaker sense) already also implies iO. As a second step, we give a heuristic contraction of oblivious LWE sampling. On a very high level, we do this by homomorphically generating pseudorandom LWE samples using an encrypted pseudorandom function.

Embodiments include new candidate constructions of iO relying on techniques from lattices and learning-with-errors (LWE). We formulate a new falsifiable assumption on the indistinguishability of two distributions, and show that our construction is secure under this assumption. This is the first iO candidate that is simultaneously based on a clearly stated falsifiable assumption and plausibly post-quantum secure. We also show that, under the LWE assumption, the ability to obliviously sample from the LWE distribution provably implies iO. Unlike prior constructions of iO from simpler primitives (e.g., functional encryption, succinct randomized encodings, XiO, etc.), oblivious LWE sampling does not inherently involve any computation and appears to be fundamentally different. Lastly, the inventive construction is conceptually simpler and more self-contained (relying on fewer disjoint components) than many of the prior candidates.

Our main building block is an "oblivious LWE sampler", which takes as input a matrix $A \in \mathbb{Z}_q^{m \times n}$ and allows us to generate LWE samples $A \cdot s + e$ with some small error $e \in \mathbb{Z}^m$ without knowing the secrets s, e. Our notion can be seen as a significant relaxation of "invertible sampling" (in the common reference string model), and the equivalent notion of "pseudorandom encodings". It has been shown that, assuming iO, it is possible to invertibly sample from all distributions, and there is an open question as to whether it may be possible to do so under simpler assumptions that do not imply iO. As a side result of independent interest, we settle this question by showing that, under LWE, even our relaxed form of invertible sampling for the specific LWE distribution already implies iO.

Overall, our candidate iO construction consists of two steps. The first step is a provably secure construction of iO assuming we have an oblivious LWE sampler and that the LWE assumption holds (both with sub-exponential security). The second step is a candidate heuristic instantiation of an oblivious LWE sampler. On a very high level, our heuristic sampler performs a homomorphic computation that outputs a pseudorandom LWE sample generated using some pseudorandom function (PRF). Security boils down to a clearly stated falsifiable assumption that two distributions, both of which output LWE samples, are indistinguishable even if we give out the corresponding LWE secrets. Our assumption implicitly relies on some form of circular security: we assume that the error term in the pseudorandom LWE sample "drowns out" any error that comes out of the homomorphic computation over the PRF key that was used to generate it. The inventive construction/assumption also avoids some crypto-analytic attacks.

We first describe what functional encodings are and how to construct iO from functional encodings. Then we describe our instantiation of functional encodings via oblivious LWE sampling.

iO from Functional Encodings

Instead of constructing iO directly, we construct a simpler a primitive called "exponentially efficient iO" XiO, which is known to imply iO under the LWE assumption. We first describe what XiO is, and then discuss how to construct it from Functional Encodings.

XiO

An XiO scheme has the same syntax, correctness and security requirements as iO, but relaxes the efficiency requirement. To obfuscate a circuit C with input length n, the obfuscator can run in exponential time $2^{O(n)}$ and the size of the obfuscated circuit can be as large as $2^{n(1-\varepsilon)}$ for some $\varepsilon > 0$. Such a scheme is useful when n is logarithmic in the security parameter, so that $2^n$ is some large polynomial. Note that there is always a trivial obfuscator that outputs the entire truth table of the circuit C, which is of size $2^n$. Therefore, XiO is only required to do slightly better than the trivial construction, in that the size of the obfuscated circuit must be non-trivially smaller than the truth table. XiO together with the LWE assumption (assuming both satisfy sub-exponential security) imply full iO.

Functional Encodings

We define a variant of the "split FHE" primitive, which we call "functional encodings". A functional encoding can be used to encode a value $x \in \{0,1\}^\ell$ to get an encoding $c = \text{Enc}(x; r)$, where $r$ is the randomness of the encoding process. Later, for any function $f:\{0,1\}^\ell \to \{0,1\}^m$, we can create an opening $d = \text{Open}(f, x, r)$ for $f$, which can be decoded to recover the function output $\text{Dec}(f, c, d) = f(x)$. We require many-opening simulation based security: the encoding $c = \text{Enc}(x; r)$ together with the many openings $d_1 = \text{Open}(f_1, x, r), d_Q = \text{Open}(f_Q, x, r)$ can be simulated given only the functions $f_1, \ldots, f_Q$ and the outputs $f_1(x), \ldots, f_Q(x)$. In other words, nothing about the encoded value x is revealed beyond the function outputs $f_i(x)$ for which openings are given. So far, we can achieve this by simply setting the opening d to be the function output $f(x)$. The notion is made non-trivial, by additionally requiring succinctness: the size of the opening d is bounded by $|d| = O(m^{1-\varepsilon})$ for some $\varepsilon > 0$, and therefore the opening must be non-trivially smaller than the output size of the function. We do not impose any restrictions on the size of the encoding c, which may depend polynomially on m. Unfortunately, this definition is unachievable in the plain model, as can be shown via a simple incompressibility argument. Therefore, we consider functional encodings in the common reference string (CRS) model and only require many-opening simulation security for some a-priori bound Q on the number of opening (i.e., Q-opening security). We allow the CRS size, (but not the encoding size or the opening size) to grow polynomially with the bound Q.

XiO From Functional Encodings

We construct XiO from functional encodings. As a first step, we construct XiO in the CRS model. Let $C:\{0,1\}^n \to \{0,1\}$ be a circuit of size $\ell$ that we want to obfuscate. We can partition the input domain $\{0,1\}^n$ of the circuit into $Q = 2^n/m$ subsets $S_i$, each containing $|S_i| = m$ inputs. We then define Q functions $f_i:\{0,1\}^\ell \to \{0,1\}^m$ such that $f_i(C) = (C(x_1), \ldots, C(x_m))$ outputs the evaluations of C on all m inputs $x_j \in S_i$. Finally, we set the obfuscation of the circuit C to be $(\text{Enc}(C; r), \text{Open}(f_1, C, r), \ldots, \text{Open}(f_Q, C, r))$, which is sufficient to recover the value of the circuit at all $Q \cdot m = 2n$ possible inputs. By carefully balancing between m and $Q = 2^n/m$, we can ensure that the obfuscated circuit size is $O(2^{n(1-\varepsilon)})$ for some constant $\varepsilon > 0$, and therefore satisfies the non-triviality requirement of XiO. On a high level, we amortize the large size of the encoding across sufficiently many openings to ensure that the total size of the encoding and all the openings together is smaller than the total output size. (In detail, assume we start with a functional encoding where the encoding size is $O(m^\alpha)$ and the opening size is $O(m^{1-\delta})$ for some constants $\alpha, \delta > 0$, ignoring any other polynomial factors in the security parameter or the input size. The size of the obfuscation circuit above is then bounded by $O(m^\alpha + Qm^{1-\delta})$. By choosing $m = 2^{n(\alpha+\delta)}$ and recalling $Q = 2^n/m$, the bound becomes $O(2^{n(1-\varepsilon)})$ for $\varepsilon = \delta/(\alpha+\delta)$.) The above gives us XiO with a strong form of simulation-based security (the obfuscated circuit can be simulated given the truth table) in the CRS model, which also implies the standard indistinguishability-based security in the CRS model.

So far, we only got XiO in the CRS model, where the CRS size can be as large as $\text{poly}(Q \cdot m) = 2^{O(n)}$. As the second step, we show that XiO in the CRS model generically implies XiO in the plain model. A naive idea would be to simply make the CRS a part of the obfuscated program, but then we would lose succinctness, since the CRS is large. Instead, we repeat a variant of the previous trick to amortize the cost of the CRS. To obfuscate a circuit $C:\{0,1\}^n \to \{0,1\}$, we partition the domain $\{0,1\}^n$ into $Q = 2^n/m$ subsets containing $m = 2^{n'}$ inputs each, and we define Q sub-circuits $C_i:\{0,1\}^{n'}\{0,1\}$, each of which evaluates C on the $m = 2^{n'}$ inputs in the i'th subset. We then choose a single CRS for input size n' and obfuscate all Q sub-circuits separately under this CRS; the final obfuscated circuit consists of the CRS and all the Q obfuscated sub-circuits. By carefully balancing between $m = 2^{n'}$ and $Q = 2^n/m$, in the same manner as previously, we can ensure that the total size of the final obfuscated circuit is $O(2^{n(1-\varepsilon)})$ for some constant $\varepsilon > 0$, and therefore the scheme satisfies the non-triviality requirement of XiO.

Constructing Functional Encodings

We now outline our construction of a functional encoding scheme. We start with a base scheme, which is insecure but serves as the basis of our eventual construction. We show that we can easily make it one-opening simulation secure under the LWE assumption, meaning that security holds in the special case where only a single opening is ever provided (i.e., Q=1). Then we show how to make it many-opening secure via oblivious LWE sampling. Concretely, we obtain a Q-opening secure functional encoding candidate for bounded-depth circuits $f: \{0,1\}^\ell \to \{0,1\}^m$ with CRS size $O(Q \cdot m)$, encoding size $O(m^2)$ and opening size $O(1)$, and where $O(\cdot)$ hides factors polynomial in the security parameter, input size $\ell$, and circuit depth.

Base Scheme

Our construction of functional encodings is based on a variant of homomorphic encryption/commitment schemes. Given a commitment to an input $x = (x_1, \ldots x_\ell) \in \{0,1\}^\ell$, along with a circuit $f: \{0,1\}^\ell \to \{0,1\}^m$, this scheme allows us to homomorphically compute a commitment to the output $y = f(x)$. Our variant is designed to ensure that the opening for the output commitment is smaller than the output size m.

Given a public random matrix $A \in \mathbb{Z}_q^{m \times n}$ where $m \gg n$, we define a commitment C to an input x via $$C = (AR_1 + x_1 G + E_1, \ldots, A R_\ell + x_\ell G + E_\ell)$$

where $R_i \leftarrow \mathbb{Z}_q^{n \times m \log q}$, $E_i \leftarrow \chi^{m \times m \log q}$ has its entries chosen from the error distribution $\chi$, and $G \in \mathbb{Z}_q^{m \times m \log q}$ is a gadget matrix. The parameters are notable. Namely, in our scheme A is a tall/thin matrix while in the prior schemes it is a short/fat matrix, we allow $R_i$ to be uniformly random over the entire space while in the prior schemes it had small entries, and we need to add some error $E_i$ that was not needed in the prior schemes. The commitment scheme is hiding by the LWE assumption. We can define the functional encoding Enc(x; r)=(A, C) to consist of the matrix A and the homomorphic commitment C, where r is all the randomness used to sample the above values.

Although we modified several key parameters, it turns out that the same homomorphic evaluation procedure there still applies to our modified scheme. In particular, given the commitment C to an input x and a boolean circuit $f:\{0,1\}^\ell \to \{0,1\}$, we can homomorphically derive a commitment $C_f=AR_f+f(x)G+E_f$ to the output $f(x)$. Furthermore, given a circuit $f: \{0,1\}^\ell \to \{0,1\}^m$ with m bit output, we can apply the above procedure to get commitments to each of the output bits and "pack" them together to obtain a vector $cf \in \mathbb{Z}_q^m$ such that $$c_f = A \cdot r_f + f(x) \cdot \frac{q}{2} + e_f \in \mathbb{Z}_q^m \quad (\text{x})$$

where $f(x) \in \{0,1\}^m$ is a column vector, $r_f \in \mathbb{Z}_q^n$, and of $e_f \in \mathbb{Z}_q^m$ is some small error term.

Now, observe that $r_f$ constitutes a succinct opening to $f(x)$, since $|r_f| \ll |f(x)|$ and $r_f$ allows us to easily recover $f(x)$ from $c_f$ by computing $\text{round}_{q/2}(c_f - A \cdot r_f)$. Furthermore, we can efficiently compute $r_f$ by applying a homomorphic computation on the opening of the input commitment, or alternately, we can sample A with a trapdoor and use the trapdoor to recover $r_f$. Therefore, we can define the opening procedure of the functional encoding to output the value $r_f$=Open($f$, x, r), and the decoding procedure can recover $f(x)$=Dec($f$, (A, C), $r_f$) by homomorphically computing $c_f$ and using $r_f$ to recover $f(x)$ as above. This gives us our base scheme (in the plain model), which has the correct syntax and succinctness properties. Unfortunately, the scheme so far does not satisfy even one-opening simulation security, since the opening $r_f$ (along with the error term of that it implicitly reveals) may leak additional information about x beyond $f(x)$.

One-Opening Security From LWE

We can modify the base scheme to get one-opening simulation security (still in the plain model). In particular, we augment the encoding by additionally including a single random LWE sample b=A·s+e inside it. We then add this LWE sample to $c_f$ to "randomize" it, and release $d_f:=r_f+s$ as an opening to $f(x)$. Given the encoding (A, C, b) and the opening $d_f$, we can decode $f(x)$ by homomorphically computing cf and outputting y=round$_{q/2}(c_f+b-A \cdot d_f)$. Correctness follows from the fact that $c_f+b \approx A(r_f+s)+f(x) \cdot q/2$.

With the above modification, we can simulate an encoding/opening pair given only $f(x)$ without knowing x. Firstly, we can simulate the opening without knowing the randomness of the input commitments or the trapdoor for A. In particular, the simulator samples $d_f$ uniformly at random from $\mathbb{Z}_q^n$, and then "programs" the value b as $$b := A \cdot d_f - c_f + f(x) \cdot \frac{q}{2} + e.$$

The only difference in the distributions is that in the real case the error contained in the LWE sample b is e, while in the simulated case it is $e-e_f$, but we can choose the error e to be large enough to "smudge out" this difference and ensure that the distributions are statistically close. Once we can simulate the opening without having the randomness of the input commitments or the trapdoor for A, we can rely on LWE to replace the input commitment to x with a commitment to a dummy value.

Many-Opening Security Via Oblivious LWE Sampling

We saw that we can upgrade the base scheme to get one-opening simulation security by adding a random LWE sample b=A·s+e to the encoding. We could easily extend the same idea to achieve Q-opening simulation security by adding Q samples $b_i=A \cdot s_i+e_i$ to the encoding. However, this would require the encoding size to grow with Q, which we cannot afford. So far, we have not relied on a CRS, and perhaps the next natural attempt would be to add the Q samples $b_i$ to the CRS of the scheme. Unfortunately, this also does not work, since the scheme needs to know the corresponding LWE secrets $s_i$ to generate the openings, and we would not be able to derive them from the CRS.

Imagine that we had an oracle that took as input an arbitrary matrix A and would output Q random LWE samples $b_i=A \cdot s_i+e_i$. Such an oracle would allow us to construct Q-opening simulation secure functional encodings. The encoding procedure would choose the matrix A with a trapdoor, call the oracle to get samples $b_i$ and use the trapdoor to recover the values $s_i$ that it would use to generate the openings. The decoding procedure would get A and call the oracle to recover the samples $b_i$ needed to decode, but would not learn anything else. The simulator would be able to program the oracle and choose the values $b_i$ itself, which would allow us to prove security analogously to the one-opening setting. We define a cryptographic primitive called an "oblivious LWE sampler", whose goal is to approximate the functionality of the above oracle in the standard model with a CRS. We can have several flavors of this notion, and we start by describing a strong flavor, which we then relax in various ways to get our actual definition.

Oblivious LWE Sampler (Strong Flavor)

A strong form of oblivious LWE sampling would consist of a deterministic sampling algorithm Sam that takes as input a long CRS along with a matrix A and outputs Q LWE samples $b_i$=Sam(CRS, A, i) for $i \in [Q]$. The size of CRS can grow with Q and the CRS can potentially be chosen from some structured distribution, but it must be independent of A. We want to be able to arbitrarily "program" the outputs of the sampler by programming the CRS. In other words, there is a simulator Sim that gets A and Q random LWE samples $\{b_i\}$ as targets; it outputs a programmed string CRS←Sim(A, $\{b_i\}$) that causes the sampler to output the target values $b_i$=Sam(CRS, A, i). We want the real and the simulated CRS to be indistinguishable, even for a worst-case choice of A for which an adversary may know a trapdoor that allows it to recover the LWE secrets. This notion would directly plug in to our construction to get a many-opening secure functional encoding scheme in the CRS model. It turns out that this strong form of oblivious LWE sampling can be seen as a special case of invertible sampling (in the CRS model), and can be constructed from iO. Invertible sampling is also equivalent to pseudorandom encodings (with computational security in the CRS model), and we answer one of the main open problems posed by that work by showing that these notions provably imply iO under the LWE assumption. Unfortunately, we do not know how to heuristically instantiate this strong flavor of oblivious LWE sampling (without already having iO).

Oblivious LWE Sampler (Relaxed)

We relax the above strong notion in several ways. Firstly, we allow ourselves to "pre-process" the matrix A using some secret coins to generate a value pub←Init(A) that is given as an additional input to the sampler $b_i$=Sam(CRS, pub, i). We only require that the size of pub is independent of the number of samples Q that will be generated. The simulator gets to program both CRS, pub to produce the desired outcome. Secondly, we relax the requirement that, by programming CRS, pub, the simulator can cause the sampler output arbitrary target values $b_i$. Instead, we now give the simulator some target values $\hat{b}_i$ and the simulator is required to program (CRS, pub)←Sim(A, $\hat{b}_i$) to ensure that the sampled values $b_i$=Sam(CRSpub, i) satisfy $b_i$=$\hat{b}_i$+$\tilde{b}_i$ for some LWE sample $\tilde{b}_i$=A·$\tilde{s}_i$+$\tilde{e}_i$ for which the simulator knows the corresponding secrets $\tilde{s}_i$, $\tilde{e}_i$. In other words, the produced samples $b_i$ need not exactly match the target values $\hat{b}_i$ given to the simulator, but the difference has to be an LWE sample $\tilde{b}_i$ for which the simulator can produce the corresponding secrets. Lastly, instead of requiring that the indistinguishability of the real and simulated (CRS, pub) holds even for a worst-case choice of A with a known trapdoor, we only require that it holds for a random A, but the adversary is additionally given the LWE secrets $s_i$ contained in the sampled values $b_i$=A·$s_i$+$e_i$. In other words, we require that real/simulated distributions of (CRS, pub, $\{s_i\}$) are indistinguishable.

We show that this relaxed form of an oblivious LWE sampling suffices in our construction of functional encodings. Namely, we can simply add pub to the encoding of the functional encoding scheme, since it is short. In a proof, we can replace the real (CRS, pub) with a simulated one, using some random LWE tuples $\hat{b}_i$ as target values. Indistinguishability holds even given the LWE secrets $s_i$ for the produced samples $b_i$=Sam(CRS, pub, i), which are used to generate the openings of the functional encoding. The $\hat{b}_i$ component of the produced samples $b_i$=$\hat{b}_i$+$\tilde{b}_i$ is sufficient to re-randomizes the output commitment $c_f$, and the additional LWE sample $\tilde{b}_i$ that is added in does not hurt security, since we know the corresponding LWE secret $\tilde{s}_i$ and can use it to adjust the opening accordingly.

Constructing an Oblivious LWE Sampler

We give a heuristic construction of an oblivious LWE sampler, by relying on the same homomorphic commitments that we used to construct our base functional encoding scheme. The high level idea is to give out a commitment to a PRF key k and let the sampling algorithm homomorphically compute a pseudorandom LWE sample $b_{prf}$:=A·$s_{prf}$+$e_{prf}$ where $s_{prf}$, $e_{prf}$ are sampled using randomness that comes from the PRF. The overall output of the sampler is a commitment to the above LWE sample, which is itself an LWE sample. While we do not know how to construct a simulator for this basic construction, we conjecture that it may already be sufficient to instantiate functional encodings (see Appendix 12). To allow the simulator to program the output, we augment the computation to incorporate the CRS. We give a more detailed description below.

The CRS is a uniformly random string, which we interpret as consisting of Q values $CRS_i \in \mathbb{Z}_q^m$. To generate pub, we sample a random key k for a pseudorandom function PRF (k,·) and set a flag bit β:=0. We creates a commitment C to the input (k,β) and we set the public value pub=(A, C). The algorithm $b_i$=Sample(CRS, pub, i) performs a homomorphic computation of the function $g_i$ over the commitment C, where $g_i$ is defined as follows:

$g_i$(k, β): Use PRF(k, i) to sample $b_i^{prf}$:=A·$s_i^{prf}$+$e_i^{prf}$ and output $b_i^*$:=$b_i^{prf}$+β·$CRS_i$.

The output of this computation is a homomorphically evaluated commitment to $b_i^*$ and has the form $b_i$=A·$s_i^{eval}$+$e_i^{eval}$+$b_i^*$ where $s_i^{eval}$, $e_i^{eval}$ come from the homomorphic evaluation. Overall, the generated samples $b_i$=Sample(CRS, pub, i) can be written as $$b_i = A \cdot (s_i^{eval} + s_i^{prf}) + (e_i^{eval} + e_i^{prf}) + \beta \cdot CRS_i$$

where $s_i^{prf}$, $e_i^{prf}$ come from the PRE output and $s_i^{eval}$, $e_i^{eval}$ come from the homomorphic evaluation.

In the real scheme, the flag β is set to 0 and so each output of Sample is an LWE sample $b_i$=A·($s_i^{eval}$+$s_i^{prf}$)+($e_i^{eval}$+$e_i^{prf}$). In the simulation, the simulator gets some target values $\hat{b}_i$ and puts them in the CRS as $CRS_i$:=$\hat{b}_i$. It sets the flag to β=1, which results in the output of Sample being $b_i$=A·($s_i^{eval}$+$s_i^{prf}$)+($e_i^{eval}$+$e_i^{prf}$)+$\hat{b}_i$. Note that the simulator knows the PRF key k and the randomness of the homomorphic commitment, and therefore knows the values ($s_i^{eval}$+$s_i^{prf}$)+($e_i^{eval}$+$e_i^{prf}$). This means that the difference between the target values $\hat{b}_i$ and the output samples $b_i$ is an LWE tuple for which the simulator knows the corresponding secrets, as required.

Security Under a New Conjecture

We conjecture that the above construction is secure. In particular, we conjecture that the adversary cannot distinguish between β=0 and β=1 given the values:

$$(CRS = \{CRS_i = A\hat{s}_i + \hat{e}_i\}_{i \in [Q]}, pub = (A, C = Commit(k, \beta)),$$
$$\{s_i = s_i^{eval} + s_i^{prf} + \beta s_i\}_{e \in [Q]})$$

We refer to this as the homomorphic pseudorandom LWE samples (HPLS) conjecture (see Conjecture 6.4 for a precise statement), and we argue heuristically why we believe it to hold. Since CRS, pub completely determine the values $b_i$=A·$s_i$+$e_i$, revealing $s_i$=$s_i^{eval}$+$s_i^{prf}$+β$\hat{s}_i$ also implicitly reveals $e_i$=$e_i^{eval}$+$e_i^{prf}$+β$\hat{e}_i$. We can think of the HPLS conjecture as consisting of two distinct heuristic components. The first component is to argue that the values $s_i$, $e_i$ look pseudorandom and independent of β given only (CRS, A), but without getting the commitment C. Intuitively, we believe this to hold since $s_i^{prf}$, $e_i^{prf}$ are provably pseudorandom (by the security of the PRF). Therefore, as long as we choose the noise $e_i^{prf}$ to be large enough to "smudge out" $\hat{e}_i$, we can provably argue that $s_i^{prf}$+β$s_i$ and $e_i^{prf}$+β$\hat{e}_i$ are pseudorandom and independent of β. Unfortunately, this does not suffice—we still need to rely on a heuristic to ague that there are no computationally discernible correlations between these values and $s_i^{eval}$, $e_i^{eval}$ respectively. We believe this should hold with most natural PRFs. Although the first component is already heuristic, there is hope to remove the heuristic nature of this component by explicitly analyzing the distributions $s_i^{eval}$+$s_i^{prf}$, $e_i^{eval}$+$e_i^{eval}$ for a specific PRF, and leave this as a fascinating open problem for future work. The second heuristic component is to argue that security holds even in the presence of the commitment C. This part implicitly involves a circular security aspect between the pseudorandom function and the commitment. We'd like to argue that the PRF key k and the bit β are protected by the security of the commitment scheme, but we release $s_i$=$s_i^{eval}$+$s_i^{prf}$+β$\hat{s}_i$, where $s_i^{eval}$ depends on the commitment randomness; nevertheless we'd like to argue that this does not hurt commitment security since the value $s_i^{eval}$ is masked by the PRF output, but this argument is circular since the PRF key is contained in the commitment. This circularity does not easily lend itself to a proof, and we see much less hope in removing the heuristic nature of the second component than the first. Still, this type of circularity also seems difficult to attack: one cannot easily break the security of the commitment without first breaking the security of the PRF and vice versa.

Simplified Construction

Other embodiments can include a simplified direct construction of functional encodings in the plain model that we conjecture to satisfy indistinguishability based security. The simplified construction does not go through the intermediate "oblivious LWE sampler" primitive. In contrast to our main construction, which is secure under a non-interactive assumption that two distributions are indistinguishable, the assumption that our simplified construction is secure and interactive.

Notations

We will denote by $\lambda$ the security parameter. The notation $negl(\lambda)$ denotes any function $f$ such that $f(\lambda)=\lambda^{-\omega(1)}$, and $poly(\lambda)$ denotes any function $f$ such that $f(\lambda)=O(\lambda^c)$ for some $c>0$. For a probabilistic algorithm alg(inputs), we might explicit the randomness it uses by writing alg(inputs; coins). We will denote vectors by bold lower case letters (e.g. a) and matrices by bold upper cases letters (e.g. A). We will denote by $a^T$ and $A^T$ the transposes of a and A, respectively. We will denote by [x] the nearest integer to x, rounding towards 0 for half-integers. If x is a vector, [x] will denote the rounded value applied component-wise. For integral vectors and matrices (i.e., those over $\mathbb{Z}$), we use the notation |r|, |R| to denote the maximum absolute value over all the entries.

We define the statistical distance between two random variables X and Y over some domain $\Omega$ as: $SD(X, Y) = \frac{1}{2}\sum_{w \in \Omega} |X(w) - Y(w)|$. We say that two ensembles of random variables $X=\{X_\lambda\}$, $Y=\{Y_\lambda\}$ are statistically indistinguishable, denoted $$X \stackrel{s}{\approx} Y,$$

if $SD(X_\lambda, Y_\lambda) \leq negl(\lambda)$.

We say that two ensembles of random variables $X=\{X_\lambda\}$, and $Y=\{Y_\lambda\}$ are computationally indistinguishable, denoted $$X \stackrel{c}{\approx} Y,$$

if, for all (non-uniform) PPT distinguishers Adv, we have $|Pr[Adv(X_\lambda)=1] - Pr[Adv(Y_\lambda)=1]| \leq negl(\lambda)$. We also refer to sub-exponential security, meaning that there exists some $\epsilon >0$ such that the distinguishing advantage is at most $2^{-\lambda^\epsilon}$.

Learning With Errors

Definition 2.1 (B-bounded distribution) We say that a distribution $\chi$ over $\mathbb{Z}$ is B-bounded if $$Pr[\chi \in [-B,B]]=1.$$

We recall the definition of the (decision) Learning with Errors problem.

Definition 2.2 ((Decision) Learning with Errors) Let $n=n(\lambda)$ and $q=q(\lambda)$ be integer parameters and $\Psi=\chi(\lambda)$ be a distribution over Z. The Learning with Errors (LWE) assumption $LWE_{n,q,\chi}$ states that for all polynomials m=poly($\lambda$) the following distributions are computationally indistinguishable:

$$(A, s^\top A + e) \stackrel{c}{\approx} (A, u)$$

where $A \leftarrow \mathbb{Z}_q^{m \times m}$, $s \leftarrow \mathbb{Z}_q^n$, $e \leftarrow \chi^m$, $u \leftarrow \mathbb{Z}_q^m$.

We rely on LWE security with the following range of parameters. We assume that for any polynomial $p=p(\lambda)=poly(\lambda)$ there exists some polynomial $n=n(\lambda)=poly(\lambda)$, some $q=q(\lambda)=2^{poly(\lambda)}$ and some $B=B(\lambda)$-bounded distribution $\chi=\chi(\lambda)$ such that $q/B \geq 2^p$ and the $LWE_{n,q,\chi}$ assumption holds. Throughout the paper, the LWE assumption without further specification refers to the above parameters. The sub-exponentially secure LWE assumption further assumes that $LWE_{n,q,\chi}$ with the above parameters is sub-exponentially secure, meaning that there exists some $\epsilon>0$ such that the distinguishing advantage of any polynomial-time distinguisher is $2^{-\lambda^\epsilon}$.

The (sub-exponentially secure) LWE assumption with the above parameters follows from the worst-case (sub-exponential) quantum hardness SIVP and classical hardness of GapSVP with sub-exponential approximation factors.

Lattice Tools

Noise Smudging

Definition 2.3 (Noise Smudging) We say that a distribution $\chi$ over $\mathbb{Z}$ smudges out noise of size B if for any fixed $\gamma \in [-B, B]$ the statistical distance between $\chi$ and $\chi+\gamma$ is $2^{-\lambda^{\Omega(1)}}$.

We will use the following fact.

Lemma 2.4 (Smudging Lemma) Let $B=B(\lambda)$, $B'=B'(\lambda) \in \mathbb{Z}$ be parameters and let U([−B, B]) be the uniform distribution over the integer interval [−B, B]. Then for any $e \in [-B', B']$, the statistical distance between U([−B, B]) and U([−B, B])+e is B'/B.

Lemma 2.5 Assume that the $LWE_{n,q,\chi}$ assumption holds for some B-bounded $\chi$, and let B' be some parameter. Then there exists a distributions $\hat{\chi}$ that is $\hat{B}=B+2^\lambda B'$ bounded such that $LWE_{n,q,\hat{\chi}}$ holds and $\hat{\chi}$ smudges out noise of size B'.

Gadget Matrix

For an integer $q \geq 2$, define: $g=(1, 2, \bullet, 2^{\lceil \log q \rceil - 1}) \in \mathbb{Z}_q^{1 \times \lceil \log q \rceil}$. The Gadget Matrix G is defined as $G = g \oplus I_n \in \mathbb{Z}_q^{n \times m}$ where $n \in \mathbb{N}$ and $m=n\lceil \log q \rceil$. There exists an efficiently computable deterministic function $G^{-1}: \mathbb{Z}_q^n \to \{0,1\}^m$ such for all $u \in \mathbb{Z}_q^n$ we have $G \cdot G^{-1}(u)=u$. We let $G^{-1}(\$)$ denote the distribution obtained by sampling $u \leftarrow \mathbb{Z}_q^n$ uniformly at random and outputting $t=G^{-1}(u)$.

Lattice Trapdoors

We rely on the fact that we can sample a random LWE matrix A together with a trapdoor td that allows us to solve the LWE problem: given b=A·s+e for a sufficiently small e, we can use the trapdoor to recover s (and hence also e) from b.

Functional Encodings

Definition of Functional Encodings

A functional encoding scheme (in the CRS model) for the family, $\mathcal{F}_{\ell,m,t} = \{f:\{0,1\}^\ell \leftarrow \{0,1\}^m\}$ of depth-t circuits consists of four PPT algorithms crsGen, Enc, Open, Dec where Open and Dec are deterministic, satisfying the following properties:

Syntax:
The algorithms have the following syntax:

CRS←crsGen($1^\lambda$, $1^Q$, $\mathcal{F}_{\ell,m,t}$) outputs CRS for security parameter $1^\lambda$ and a bound Q on the number of openings;

C←Enc(CRS, x∈$\{0,1\}^\ell$; r) encodes x using randomness r;

d←Open(CRS, $f$: $\{0,1\}^\ell \leftarrow \{0,1\}^m$, i∈[Q], x, r) computes the opening corresponding to i'th function $f$;

y←Dec(CRS, $f$, i, C, d) computes a value y for the encoding C and opening d.

Correctness:

$$Dec(f, Enc(x,r), Open(f,x,r)) = f(x)$$

Q-SIM Security: There exists a PPT simulator Sim such that the following distributions for all PPT adversaries $\mathcal{A}$ and all x, $f^1, \ldots, f^Q \leftarrow \mathcal{A}(1^\lambda)$, the following distributions of (CRS, C, $d_1, \ldots, d_Q$) are computationally indistinguishable (even given x, $f^1, \ldots, f^Q$):

Real Distribution: CRS←crsGen($1^\lambda$, $1^Q$), C←Enc(CRS, x; r), $d_i$←Open(CRS, $f^i$, i, x, r), i∈[Q].

Simulated Distribution: (CRS, C, $d_1, \ldots, d_Q$)←Sim($\{f^i, f^i(x)\}^{i \in Q}$).

Succinctness: There exists a constant ∈>0 such that, for CRS←crsGen($1^\lambda$, $1^Q$, $\mathcal{F}_{\ell,m,t}$), C←Enc(CRS, x; r), d←Open(CRS, $f$, i, x, r) we have:

|CRS|=poly(Q, $\lambda$, $\ell$, m, t), |C|=poly($\lambda$, $\ell$, m, t), |d|=$m^{1-\epsilon}$poly($\lambda$, $\ell$, t).

In our discussion, we also refer to indistinguishability-based security, a relaxation of Q–SIM security:

Q–IND Security For all PPT adversaries $\mathcal{A}$ and all $x_0, x_1, f^1, \ldots, f^Q \leftarrow \mathcal{A}(1^\lambda)$ such that $f^i(x_0) = f^i(x_1)$ for all i∈[Q], the following distributions of (CRS, C, $d_1, \ldots, d_Q$) are computationally indistinguishable for β=0 and β=1:

CRS←crsGen($1^\lambda$, $1^Q$), C←Enc(CRS, $x^\beta$; r), $d_i$←Open(CRS, $f^i$, i, $x^\beta$, r), i∈[Q]

Homomorphic Commitments with Short Openings

In this section, we describe a homomorphic commitment scheme with short openings.

Lemma 4.1 (Homomorphic computation on matrices) Fix parameters m, q, $\ell$, Given a matrix C∈$\mathbb{Z}_q^{m \times \ell m \log q}$ and a circuit $f$: $\{0,1\}^\ell \leftarrow \{0,1\}$ of depth t, we can efficiently compute a matrix $C_f$ such that for all x∈$\{0,1\}^\ell$, there exists a matrix $H_{c,f,x} \in \mathbb{Z}^{\ell m \log q \times m \log q}$ with $|H_{c,f,x}| = m^{O(t)}$ such that $$(C - x^T \otimes G) \cdot H_{c,f,x} = C_f - f(x)G$$

where G∈$\mathbb{Z}_q^{m \times m \log q}$ is the gadget matrix. Moreover, $H_{C,f,x}$ is efficiently computable given C, $f$, x.

Using packing techniques, the above relation extends to circuits with m-bit output. Concretely, given a circuit $f:\{0,1\}^\ell \leftarrow \{0,1\}^m$ of depth t, we can efficiently compute a vector $c_f$ such that for all x∈$\{0,1\}^\ell$, there exists a vector $H_{C,f,x} \in \mathbb{Z}^{\ell m \log q}$ with $|h_{C,f,x}| = m^{O(t)}$ such that $$(C - x^T \otimes G) \cdot h_{C,f,x} = c_f - f(x) \cdot \frac{q}{2}$$

where $f(x) \in \{0,1\}^m$ is a column vector. Concretely, let $f^1, \ldots, f_m:\{0,1\}^m \leftarrow \{0,1\}$ denote the circuits computing the output bits of $f$. Then, we have:

$$c_f = \sum_{j=1}^m C_{f_j} \cdot G^{-1}\left(1_j \cdot \frac{q}{2}\right)$$

$$h_{C,f,x} = \sum_{j=1}^m H_{C,f_j,x} \cdot G^{-1}\left(1_j \cdot \frac{q}{2}\right)$$

where $1_j \in \{0,1\}^m$ is the indicator column vector whose j'th entry is 1 and 0 everywhere else, so that $f(x) = \Sigma_j f_i(x) \cdot 1_j$. Here, $H_{C,f,x}$ is also efficiently computable given C, $f$, x.

Construction 4.2 (homomorphic commitments pFHC) The commitment scheme pFHC ("packed fully homomorphic commitment") is parameterized by m, $\ell$ and n, q, and is defined as follows.

Gen chooses a uniformly random matrix A←$\mathbb{Z}_q^{n \times n}$.

Com(A∈$\mathbb{Z}_q^{m \times n}$, x∈$\{0,1\}^\ell$; R∈$\mathbb{Z}_q^{n \times \ell m \log q}$, E∈$\mathbb{Z}^{m \times \ell m \log q}$) outputs a commitment $$C := AR + x^T \otimes G + E \in \mathbb{Z}_q^{m \times \ell m \log q}.$$

Here, R←$\mathbb{Z}_q^{n \times \ell m \log q}$, E←$\chi^{m \times \ell m \log q}$ Eval($f$:$\{0,1\}^\ell \leftarrow \{0,1\}^m$, C∈$\mathbb{Z}_q^{m \times \ell m \log q}$) for a boolean circuit $f$:$\{0,1\}^\ell \leftarrow \{0,1\}^m$, deterministically outputs a (column) vector $c_f \in \mathbb{Z}_q^m$. Here, $c_f$ is the same as that given above.

Eval$_{open}$($f$, A∈$\mathbb{Z}_q^{m \times n}$, x∈$\{0,1\}^\ell$, R∈$\mathbb{Z}_q^{n \times \ell m \log q}$, E∈$\mathbb{Z}^{m \times \ell m \log q}$): deterministically outputs (column) vectors $r_f \in \mathbb{Z}_q^n$, $e_f \in \mathbb{Z}_q^m$.

Lemma 4.3 The above commitment scheme pFHC satisfies the following properties:

Correctness. For any boolean circuit $f:\{0,1\}^\ell \leftarrow \{0,1\}^m$ of depth t, any x∈$\{0,1\}^\ell$, any A∈$\mathbb{Z}_q^{m \times n}$, R∈$\mathbb{Z}_q^{n \times \ell m \log q}$, E∈$\mathbb{Z}^{m \times \ell m \log q}$, we have C:=Com(A, x; R, E), $c_f$:=Eval($f$, C), ($r_f, e_f$):=Eval$_{open}$($f$, A, x, R, E)

satisfies $$c_f = A r_f + f(x) \cdot \frac{q}{2} + e_f \in \mathbb{Z}_q^m$$

where $f(X) \in \{0,1\}^m$ is a column vector and $|e_f| = |E| \cdot m^{O(t)}$.

Privacy. Under the LWE assumption, for all $x \in \{0,1\}^\ell$, we have:

A, Com(A, x) $\approx_c$ A, Com(A, 0)

Handling $f: \{0,1\}^\ell \leftarrow \mathbb{Z}_q^m$.

Next, we observe that we can also augment pFHC with a pair of algorithms $\text{Eval}^q$, $\text{Eval}_{open}^q$ to support bounded-depth circuits $f: \{0,1\}^\ell \leftarrow \mathbb{Z}_q^m$). That is, Correctness II. For any boolean circuit $f: \{0,1\}^\ell \leftarrow \mathbb{Z}_q^m$ of depth t, any $x \in \{0,1\}^\ell$, any $A \in \mathbb{Z}_q^{m \times n}$, $R \in \mathbb{Z}_q^{n \times \ell m \log q}$, $E \in \mathbb{Z}^{m \times \ell m \log q}$, we have $$C := \text{Com}(A, x; R, E), c_f := \text{Eval}^q(f, C), (r_f, e_f) := \text{Eval}_{open}^q(f, A, x, R, E)$$

satisfies $$c_f = A r_f + f(x) + e_f \in \mathbb{Z}_q^m$$

where $f(x) \in \mathbb{Z}_q^m$ is a column vector and $|e_f| = |E| \cdot m^{O(t)}$.

Concretely, let $f_1, \ldots, f_{m \log q}: \{0,1\}^m \leftarrow \{0,1\}$ denote the circuits computing the output of $f$ interpreted as bits. Then, we have:

$$c_f = \sum_{j=1}^{m \log q} C_{f_j} \cdot G^{-1}(1_j \oplus g^T)$$

$$h_{C, f, x} = \sum_{j=1}^{m \log q} H_{C, f_j, x} \cdot G^{-1}(1_j \oplus g^T)$$

1-SIM Functional Encoding from LWE

We construct a 1-SIM functional encoding scheme for bounded-depth circuits $\mathcal{F}_{\ell, m, t}$ based on the LWE assumption. We provide a more direct construction that avoids key-switching.

Construction 5.1

Enc(x; A, R, E, s, e). Sample
$A \leftarrow \mathbb{Z}_q^{m \times n}$, $R \leftarrow \mathbb{Z}_q^{n \times \ell m \log q}$, $E \leftarrow \chi^{m \times \ell m \log q}$, $s \leftarrow \mathbb{Z}_q^n$, $e \leftarrow \hat{\chi}^m$
Compute $$C := \text{pFHC.Com}(A, x; R, E), b := As + e$$

and output
(A, C, b)

Open($f$, x; A, R, E, s, e): Compute $(r_f, e_f) := \text{pFHC.Eval}_{open}(f, A, x, R, E)$ and output $$d := r_f + s \in \mathbb{Z}_q^n$$

Dec($f$, (A, C, b), d): Compute $c_f := \text{pFHC.Eval}(f, C)$ and output $$\text{round}_{q/2}(c_f + b - Ad) \in \{0,1\}^m$$

where $\text{round}_{q/2}: \mathbb{Z}_q^m \to \{0,1\}^m$ is coordinate-wise rounding to the nearest multiple of q/2.

Parameters. Here, $\chi$ is B-bounded, and $\hat{\chi}$ is $\hat{B}$-bounded. The choice of n, q, $\chi$, B comes from the LWE assumption subject to $n = \text{poly}(t, \lambda)$, $\hat{B} = B \cdot m^{O(t)} \cdot 2^\lambda$, $q = B \cdot 2^\lambda = B \cdot m^{O(t)} \cdot 2^{2\lambda}$ We choose $\hat{\chi}$ to smudge out noise of size $B \cdot m^{O(t)}$ and rely on Lemma 2.5. In particular, this guarantees that the size of the encoding/opening is bounded by $$|C| = O(\ell m^2 \log q) = \tilde{O}(\ell m^2), |d| = O(n \log q) = \tilde{O}(m)$$

where $\tilde{O}(\cdot)$ hides $\text{poly}(\lambda, t, \log m)$ factors.

Oblivious Sampling From Falsifiable Assumption

Oblivious LWE sampling allows us to compute Q seemingly random LWE samples $b_i = As_i + e_i$ relative to some LWE matrix A, by applying some deterministic function to a long CRS that is independent of A along with a short public value pub that can depend on A but whose length is independent of Q. We require that there is a simulator that can indistinguishably program CRS, pub to ensures that the resulting samples $b_i$ "almost match" some arbitrary LWE samples $\hat{b}_i$ given to the simulator as inputs. Ideally, the simulator could ensure that $b_i = \hat{b}_i$ match exactly. However, we relax this and only require the simulator to ensure that $b_i = \hat{b}_i + \tilde{b}_i$ for some LWE sample $\tilde{b}_i = A\tilde{s}_i + \tilde{e}_i$ for which the simulator knows the corresponding secret $\tilde{s}_i$. Note that the simulator does not get the secrets $\hat{s}^i$ for the target values $\hat{b}_i = A\hat{s}_i + \hat{e}_i$, but indistinguishability should hold even for a distinguisher that gets the secrets $s_i$ for the output samples $b_i = As_i + e_i$. We show in Appendix 10 that we can construct a strong form of oblivious sampling using the notion of invertible sampling (in the CRS model), which can be constructed from iO. This highlights that the notion is plausibly achievable. We then give a heuristic constructions of oblivious LWE sampling using LWE-style techniques and heuristically argue that security holds under a new falsifiable assumption.

Definition of Oblivious Sampling

An oblivious LWE sampler consists of four PPT algorithms: $\text{CRS} \leftarrow \text{crsGen}(1^\lambda, 1^Q)$, $\text{pub} \leftarrow \text{Init}(A)$, $b_i = \text{Sample}(\text{CRS}, \text{pub}, i)$ and $(\text{CRS}, \text{pub}, \{\tilde{s}_i\}_{i \in [Q]}) \leftarrow \text{Sim}(1^\lambda, 1^Q, A, \{\hat{b}_i\}_{i \in [Q]})$. The Sample algorithm is required to be deterministic while the others are randomized.

Definition 6.1 An $(n, m, \hat{\chi}, B_{OLWE})$ oblivious LWE sampler satisfies the following properties:

Let $Q = Q(\lambda)$ be some polynomial. Let $(A, \text{td}) \leftarrow \text{TrapGen}(1^n, 1^m, q)$, $\text{CRS} \leftarrow \text{crsGen}(1^\lambda, 1^Q)$, $\text{pub} \leftarrow \text{Init}(A)$. Then, with overwhelming probability over the above values, for all $i \in [Q]$ there exists some $s_i \in \mathbb{Z}_q^n$ and $e_i \in \mathbb{Z}_q^m$ with $\|e_i\|_\infty \leq B_{OLWE}$ such that $b_i = As_i + e_i$.

The following distributions of $(\text{CRS}, A, \text{pub}, \{s_i\}_{i \in [Q]})$ are computationally indistinguishable:

Real Distribution: Sample $(A, \text{td}) \leftarrow \text{TrapGen}(1^n, 1^m, q)$, $\text{CRS} \leftarrow \text{crsGen}(1^\lambda, 1^Q)$, $\text{pub} \leftarrow \text{Init}(A)$. For $i \in [Q]$ set $b_i = \text{Sample}(\text{CRS}, \text{pub}, i)$, $s_i = \text{LWESolve}_{td}(b_i)$. Output $(\text{CRS}, A, \text{pub}, \{s_i\}_{i \in [Q]})$.

Simulated Distribution: Sample $(A, \text{td}) \leftarrow \text{TrapGen}(1^n, 1^m, q)$, $\hat{s}_i \leftarrow \mathbb{Z}_q^n$, $\hat{e}_i \leftarrow \hat{\chi}^m$ and let $\hat{b}_i = A\hat{s}_i + \hat{e}_i$. Sample $(\text{CRS}, \text{pub}, \{\tilde{s}_i\}_{i \in [Q]}) \leftarrow \text{Sim}(1^\lambda, 1^Q, A, \{\hat{b}_i\}_{i \in [Q]})$ and let $s_i = \hat{s}_i + \tilde{s}_i$. Output $(\text{CRS}, A, \text{pub}, \{s_i\}_{i \in [Q]})$.

Observe that the algorithm $\text{pub} \leftarrow \text{Init}(A)$ in the above definition does not get Q as an input and therefore the size of pub is independent of Q. On the other hand, the algorithm $\text{CRS} \leftarrow \text{crsGen}(1^\lambda, 1^Q)$ does not get A as an input and hence CRS must be independent of A. This is crucial and otherwise there would be a trivial construction where either CRS or pub would consist of Q LWE samples with respect to A.

Note that the security property implicitly also guarantees the following correctness property of the simulated distribution. Assume we simulate the values (CRS, A, pub, $\{\tilde{s}_i\}_{i \in [Q]}) \leftarrow \text{Sim}(1^\lambda, 1^Q, A, \{\hat{b}_i\}_{i \in [Q]})$ where the simulator is given LWE samples $\hat{b}_i = A\hat{s}_i + \hat{e}_i$ as input. Then the resulting (CRS, A, pub) will generate samples $b_i = \text{Sample}(\text{CRS}, \text{pub}, i)$ of the form $b_i = \hat{b}_i + \tilde{b}_i$ where $\tilde{b}_i = A\tilde{s}_i + \tilde{e}_i$ some small $\tilde{e}_i$. This is because, in the simulation, we must have $b_i = A\hat{s}_i + \hat{e}_i$ where $\|\hat{e}_i\|_\infty \leq B$ as otherwise it would be trivial to distinguish the simulation from the real case. But $s_i = \hat{s}_i + \tilde{s}_i$ and so $e_i = \hat{e}_i + \tilde{e}_i$. This implies $\tilde{e}_i = e_i - \hat{e}_i$ will be small.

Heuristic Construction

We now give our heuristic construction of an oblivious LWE sampler. Let n, m, q be some parameters and $\chi$, $\chi_{prf}$, $\hat{\chi}$ be distributions over $\mathbb{Z}$ that are B, $B_{prf}$, $\hat{B}$ bounded respectively. Let D be an algorithms that samples tuples (s, e) where $s \leftarrow \mathbb{Z}_q^n$ and $e \leftarrow \chi_{prf}^m$. Assume that D uses v random coins, and for $r \in \{0,1\}^v$ define (s, e)=D(r) to be the output of D with randomness r. Let PRF:$\{0,1\}^\lambda \times \{0,1\}^* \leftarrow \{0,1\}^v$ be a pseudorandom function. We rely on the homomorphic commitment algorithms Com, $\mathrm{Eval}^q$, $\mathrm{Eval}_{open}^q$ with parameters n, m, q, $\chi$ described above.

Construction 6.3 We define the oblivious LWE sampler as follows:

CRS←crsGen($1^\lambda$, $1^Q$):CRS:=(CRS$_1$, ..., CRS$_Q$) where CRS$_i \leftarrow \mathbb{Z}_q^m$.

pub←Init(A): Sample a PRE key $k \leftarrow \{0,1\}^\lambda$ and set a flag $\beta := 0$. Set pub:=(A, C) where C←Com(A, (k, $\beta$)).

$b_i$=Sample(CRS, pub, i): Let $g_{i,CRS_i,A}:\{0,1\}^{\lambda+1} \leftarrow \mathbb{Z}_q^m$ be a circuit that contains the values (i, A, CRS$_i$) hard-coded and performs the computation:

$$g_{i,CRS_i,A}(k,\beta):\mathrm{Let}(s_i^{prf}, e_i^{prf})=$$

$$D(PRF(k,i)) \cdot \mathrm{Output} A\ s_i^{prf} + e_i^{prf} + \beta \cdot CRS_i.$$

Output $b_i = \mathrm{Eval}^q(g_{i,CRS_i,A}, C)$.

(CRS, pub, $\{\tilde{s}_i\}_{i \in [Q]}$)←Sim($1^\lambda$, $1^Q$, A, $\{\hat{b}_i\}_{i \in [Q]}$):Set CRS:=($\hat{b}_i$, ..., $\hat{b}_Q$). Set the flag $\beta := 1$ and pub:=(A, C) for C=Com((k, $\beta$); R, E) where R, E is the randomness of the commitment. Let $(r_i^{eval}, e_i^{eval}) = \mathrm{Eval}_{open}^q(g_{i,CRS_i,A}, (k, \beta), R, E)$ and $(s_i^{prf}, e_i^{prf}) = D(PRF(k, i))$. Set $\tilde{s}_i = r_i^{eval} + s_i^{prf}$.

Form of Samples $b_i$

Let us examine this construction in more detail and see what the samples $b_i$ look like.

In the real case, where pub←Init(A), we have pub=(A, C) where C=Com(A, (k, 0); (R, E)). For $b_i$=Sample (CRS, pub, i) we can write $$b_i = A + \underbrace{\left(r_i^{eval} + s_i^{prf}\right)}_{s_i} + \underbrace{\left(e_i^{eval} + e_i^{prf}\right)}_{e_i} \quad (A)$$

where $(s_i^{prf}, e_i^{prf}) = D(PRF(k, i))$ are sampled using the PRF and $(r_i^{eval}, e_i^{eval}) = \mathrm{Eval}_{open}^q (g_i, A, (k, 0), R, E)$ come from the homomorphic evaluation.

In the simulated case, where CRS, pub are chosen by the simulator, we have pub=(A, C) where C=Com(A, (k, 1); (R, E)) and CRS$_i = \hat{b}_i = A\hat{s}_i + \hat{e}_i$. For $b_i$=Sample(CRS, pub, i) we can write $$b_i = A\left(\underbrace{r_i^{eval} + s_i^{prf}}_{s_i} + \hat{s}_i\right) + \underbrace{\left(e_i^{eval} + e_i^{prf}\right)}_{e_i} + \hat{e}_i$$

where $(s_i^{prf}, e_i^{prf}) = D(PRF(k, i))$ are sampled using the PRF and $(r_i^{eval}, e_i^{eval}) = \mathrm{Eval}_{open}^q (g_{i,CRS_i,A}, A, (k, 0), R, E)$ come from the homomorphic evaluation.

Correctness

Equation A above implies that the scheme satisfies the correctness of an n, m, q, $\hat{\chi}$, $B_{OLWE}$ oblivious LWE sampler, where $B_{OLWE}$ is a bound $\|e_i\|_\infty$. In particular, $B \leq B_{prf} + B \cdot m^{O(t)}$, where t is the depth of the circuit $g_{i,CRS_i,A}$ (which is dominated by the depth of the PRF).

Security Under a New Conjecture

The security of our heuristic oblivious sampler boils down to the indistinguishability of the real and simulated distributions, which is captured by the following conjecture:

Conjecture 6.4 (HPLS Conjecture) For $\beta \in \{0, 1\}$, let us define the distribution DIST($\beta$) over $$(\{\hat{b}_i = A\hat{s}_i + \hat{e}_i\}_{i \in [Q]}, A, C, \{s_i = r_i^{eval} + s_i^{prf} + \beta \cdot \hat{s}_i\}_{i \in [Q]})$$

where $A \leftarrow \mathbb{Z}_q^{m \times n}$, $\hat{s}_i \leftarrow \mathbb{Z}_q^n$, $\hat{e}_i \leftarrow \chi^m$, $\hat{b}_i := A\hat{s}_i + \hat{e}_i$.
$k \leftarrow \{0,1\}^\lambda$, (C=A·R+E+(k, $\beta$)⊕G)←Com(A, (k, $\beta$); (R, E))
$(s_i^{prf}, e_i^{prf}) := D(PRF(k, i))$, $(r_i^{eval}, e_i^{eval}) := \mathrm{Eval}_{open}^q (q_{i,\hat{b}_i,A}, A, (k, \beta), R, E)$ where $$g_{i,\hat{b}_i,A}(k,\beta):\mathrm{Let}(s_i^{prf}, e_i^{prf})=$$

$$D(PRF(k,i)) \cdot \mathrm{Output} A\ s_i^{prf} + e_i^{prf} + \beta \cdot \hat{b}_i.$$

$s_i := (r_i^{eval} + s_i^{prf} + \beta \cdot \hat{s}_i)$.

The (sub-exponential) homomorphic pseudorandom LWE samples (HPLS) conjecture with parameters (n, m, q, $\chi$, $\hat{\chi}$, $\chi_{prf}$) and pseudodorandom function PRF says that the distributions DIST(0) and DIST(1) are (sub-exponentially) computationally indistinguishable.

When we do not specify parameters, we assume the conjecture holds for some choice of PRF and any choices of n, q, $\chi$, $\hat{\chi}$ and any polynomial m, such that LWE$_{n,q,\chi}$ and LWE$_{n,q,\hat{\chi}}$ assumptions hold and $\chi_{prf}$ smudges out error of size $\hat{B} + B \cdot m^{O(t)}$, where t is the depth of the circuit $g_{i,CRS_i,A}$ (which is dominated by the depth of the PRE).

Q-SIM Functional Encodings From Oblivious Sampling

We construct a Q-SIM functional encoding scheme (crsGen, Enc, Open, Dec) for bounded-depth circuits $\mathcal{F}_{\ell,m,t}$ from LWE and an oblivious LWE sampler (OLWE. crsGen, Init, Sample).

Construction 7.1 crsGen($1^\lambda$, $1^Q$, $\mathcal{F}_{\ell,m,t}$). Output OLWE. crsGen($1^\lambda$, $1^Q$).
Enc(CRS, x): Sample
(A, td)←TrapGen($1^n$, $1^m$, q), pub←Init(CRS, A), R← $\mathbb{Z}_q^{n \times \ell m \log q}$, E← $\chi^{m \times \ell m \log q}$ Compute C:=pFHC. Com(A, x; R, E)
and output
(pub, A, C)
Open($f^i$, x): Compute
$(r_{f^i}, e_{f^i})$:=pFHC. $\mathrm{Eval}_{open}(f^i, A, x, R, E)$, $b_i$:=Sample (CRS, pub, i), $s_i$:=LWESolve$_{td}(b_i)$
and output $$d_i := r_{f^i} + s_i \in \mathbb{Z}_q^n$$

Dec($f^i$, (pub, A, C), $d_i$): Compute
$C_{f^i}$:=pFHC. Eval($f$, C), $b_i$:=Sample (CRS, pub, i)
and output
$y_i$:=round$_{q/2}(c_{f^i}+b_i—Ad_i)\in\{0,1\}^m$

Parameters

We rely on the n, q, χ LWE assumption, where χ is B-bounded. We rely on an (n, m, q, $\hat{χ}$, $B_{OLWE}$) oblivious sampler where $\hat{χ}$ is some distribution that smudges out error of size $Bm^{O(t)}$; relying on Lemma 2.5, we can assume $\hat{χ}$ is $\hat{B}$ bounded for $\hat{B}=B \cdot m^{O(t)} \cdot 2^λ$. We assume that $B_{OLWE}=2^{p(λ)}\hat{B}$ for some polynomial p(λ). We need $B_{OLWE}+Bm^{O(t)} \le q/4$. This is guaranteed by our heuristic construction.

In particular, we can set
n=poly(t, Δ), $\hat{B}=B \cdot m^{O(t)} \cdot 2^λ$, q=$(B_{OLWE}+B \cdot m^{O(t)}) \cdot 2^λ=2^{p(λ)+λ}B \cdot m^{O(t)}$ In particular, this guarantees that the size of the encoding/opening is bounded by $$|C|=O(\ell m^2 \log q)=\tilde{O}(\ell m^2), |d|=O(n \log q)=\tilde{O}(m)$$

where $\tilde{O}(\cdot)$ hides poly(λ, t, log m) factors.

Under the LWE assumption and the existence of a (n, m, q, χ, B) oblivious LWE sampler, the construction above is a Q-SIM functional encoding.

10 from Functional Encodings

Definition 8.1 (XiO) A pair of algorithms (XiO, Eval) is an exponentially efficient indistinguishability obfuscator (XiO) scheme if it satisfies the following:

Correctness: For all circuits C:$\{0,1\}^n \to \{0,1\}$ and for all inputs $x \in \{0,1\}^n$ we have Pr[Eval($\tilde{C}$, x)=C(x):$\tilde{C} \leftarrow$XiO($1^λ$, C)]=1.

(Sub-Eponential) Security: Let $\{C_λ^0\}$, $\{C_λ^1\}$ be two circuit ensembles such that $C_λ^0$, $C_λ^1$ have the same input size, circuit size, and compute the same function. Furthermore, the input size is logarithmic n=O(log λ). Then we require that the distributions XiO($1^λ$, $C_λ^0$) and XiO($1^λ$, $C_λ^1$) are (sub-exponentially) computationally indistinguishable.

Efficiency: For a circuit C:$\{0,1\}^n \to \{0,1\}$ with input length n and size s:

The run-time of the obfuscation algorithm XiO($1^λ$, C) is poly($2^n$, λ, s).

There is some constant ε>0 such that the size of the obfuscated circuit outputted by XiO($1^λ$, C) is $2^{n(1-ε)}$poly(λ, s).

The run-time of Eval is polynomial in its input size, meaning poly($2^n$, λ, s).

XiO+LWE implies iO.

XiO With CRS

We also consider XiO in the common reference string (CRS) model where the scheme is initiated by generating a CRS←crsGen($1^λ$, $1^n$, $1^s$) that depends on the input length n and the circuit size s. The algorithm $\tilde{C} \leftarrow$XiO($1^λ$, CRS, C) nand Eval(CRS, $\tilde{C}$, x) now both take CRS as an input. The security property needs to hold even if the the distinguisher is given the CRS. For efficiency, in addition to the requirements we had previously, we also require that the run-time of crsGen and its output size are bounded by poly($2^n$, λ, s).

From CRS to Plain Model XiO

Assume (crsGen, XiO, Eval) is an XiO scheme in the CRS model. We define an XiO scheme (XiO', Eval') in the plain model. The scheme is defined as follows:

On input a circuit C:$\{0,1\}^n \to \{0,1\}$ as a circuit with input length n and size |C|=s.

Let $n_1$, $n_2$ be parameters (defined later) such that $n_1+n_2$=n and let Q:=$2^{n_1}$.

Define Q=$2^{n_1}$ circuits $C_i$:$\{0,1\}^{n_2} \to \{0,1\}$ such that $C_i(x)$ computes C(i||x), where we identify i∈[$2^{n_2}$] with a string in $\{0,1\}^{n_2}$.

Sample CRS←crsGen($1^λ$, $1^{n_2}$, $1^s$) and for i∈[Q] set $\tilde{C}_i$←XiO($1^λ$, CRS, $C_i$).

Define $\tilde{C}$=(CRS, $\{\tilde{C}_i\}_{i \in [Q]}$).

Eval'($\tilde{C}$, x):Parse x=(i, x')∈$\{0,1\}^{n_1} \times \{0,1\}^{n_2}$. Output Eval (CRS, $\tilde{C}_i$, x').

We know that the length of the CRS←crsGen($1^λ$, $1^n$, $1^s$) is at most poly($2^n$, λ, s)≤$2^{α \cdot n}$poly(λ, s) for some constant α and the size of the obfuscated circuit outputted by XiO($1^λ$, CRS, C) is $2^{n(1-ε)}$poly(λ, s) for some ε>0. Set $n_2=n/(α+ε)$ and $n_1=n-n_2$ in the above construction.

From Functional Encodings to XiO with CRS

Assume that (crsGen, Com, Open, Dec) is a functional encoding scheme. We define (crsGen', XiO, Eval) to be an XiO scheme in the CRS model. Given n, we define $n_1$, $n_2$ to be parameters (that we set later) such that $n_1+n_2$=n and let Q:=$2^{n_1}$ and m=$2^{n_2}$.

crsGen($1^λ$, $1^n$, $1^s$): Output CRS←crsGen($1^λ$, $1^Q$, $\mathcal{F}_{\ell,m,t}$) where t=poly(s) is an upper bound on the size (and depth) of the universal circuit that evaluates a circuit of size s and $\ell$=s.

XiO($1^λ$, CRS, C): Compute c←Com(CRS, C; r). For i∈[Q], define the functions $f_i$:$\{0,1\}^s \leftarrow \{0,1\}^m$ such that $f_i(C)$=(C(i||1), . . . , C(i||m)) where we identify [Q] with $\{0,1\}^{n_1}$ and [m] with $\{0,1\}^{n_2}$. Note that $f_i$ computes m parallel copies of the universal circuit and is therefore of depth t. Let $d_i$=Open(CRS, $f$, i, C, r). Output $\tilde{C}$=(c, $d_1$, . . . , $d_Q$).

Eval(CRS, $\tilde{C}$, x): Parse x=(i, j)∈[Q]×[m]. Compute y=Dec(CRS, $f_i$, i, c, $d_i$). Output the j'th bit of y.

We consider a succinct functional encoding where, for CRS←crsGen($1^λ$, $1^Q$, $\mathcal{F}_{\ell,m,t}$), the size of the CRS is poly(λ, Q, $\ell$, m, t), the length of C←Com(CRS, x; r) is at most $m^α$poly(λ, t, $\ell$) for some constant α, and that the size of the opening $d_i$=Open(CRS, $f$, i, C, r) is $2^{m(1-ε)}$poly(λ, t, $\ell$) for some ε>0. Set $n_2=n/(α+ε)$ and $n_1=n-n_2$ in the above construction.

Hardware Overview

With reference to FIG. 1, an example system for securing a set of instructions by obfuscation is illustrated. An original set of non-obfuscated instructions (105) is provided to a computerized obfuscation processor (110) which is further configured to execute the inventive obfuscation processes described herein. The output of the obfuscation processor (110) can be stored on a computer-readable storage (115) of any suitable type. Those instructions can then be retrieved from the storage (115) and executed by a conventional processor (120). As described herein, in some embodiments the processor may be incorporated into a mobile computing device, such as a mobile phone or similar.

Figure 2:
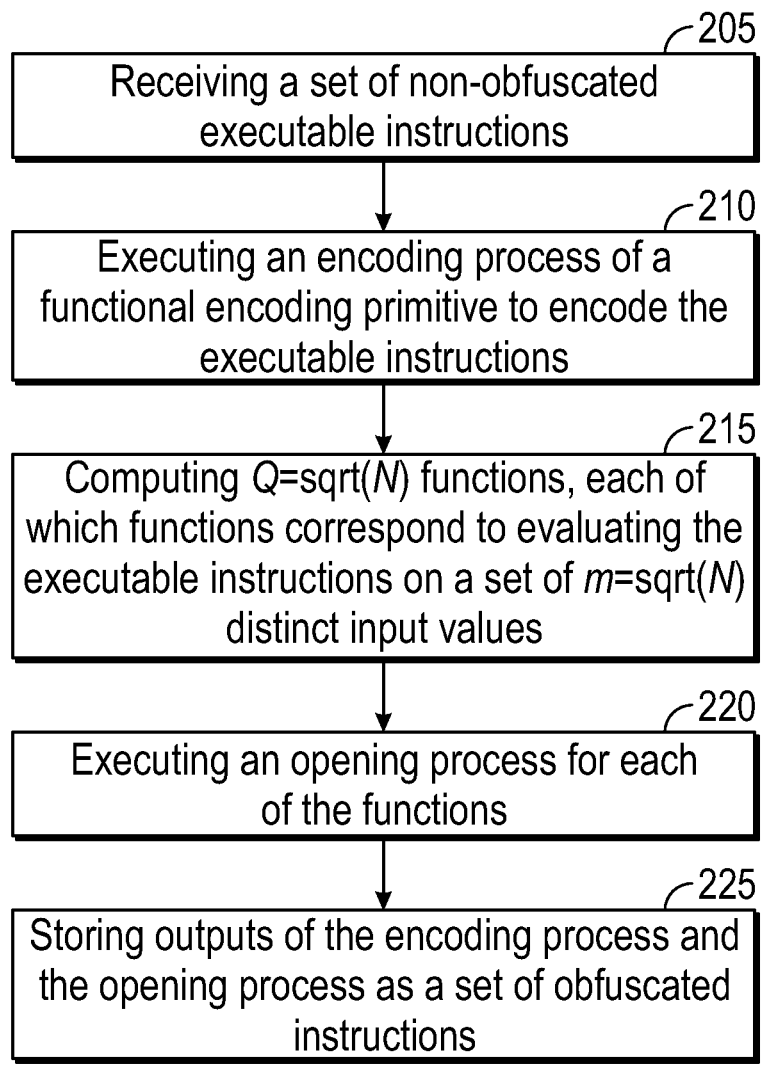
FIG. 2 illustrates an example method for securing a set of instructions by obfuscation.

With reference to FIG. 2, an example method for securing a set of instructions by obfuscation is illustrated. The method includes receiving a set of non-obfuscated executable instructions (205), executing an encoding process of a functional encoding primitive to encode the executable instructions (210), computing Q=sqrt(N) functions, each of which functions correspond to evaluating the executable instructions on a set of m=sqrt(N) distinct input values (215), executing an opening process for each of the functions (220), and storing outputs of the encoding process and the opening process as a set of obfuscated instructions (225).

Figure 3:
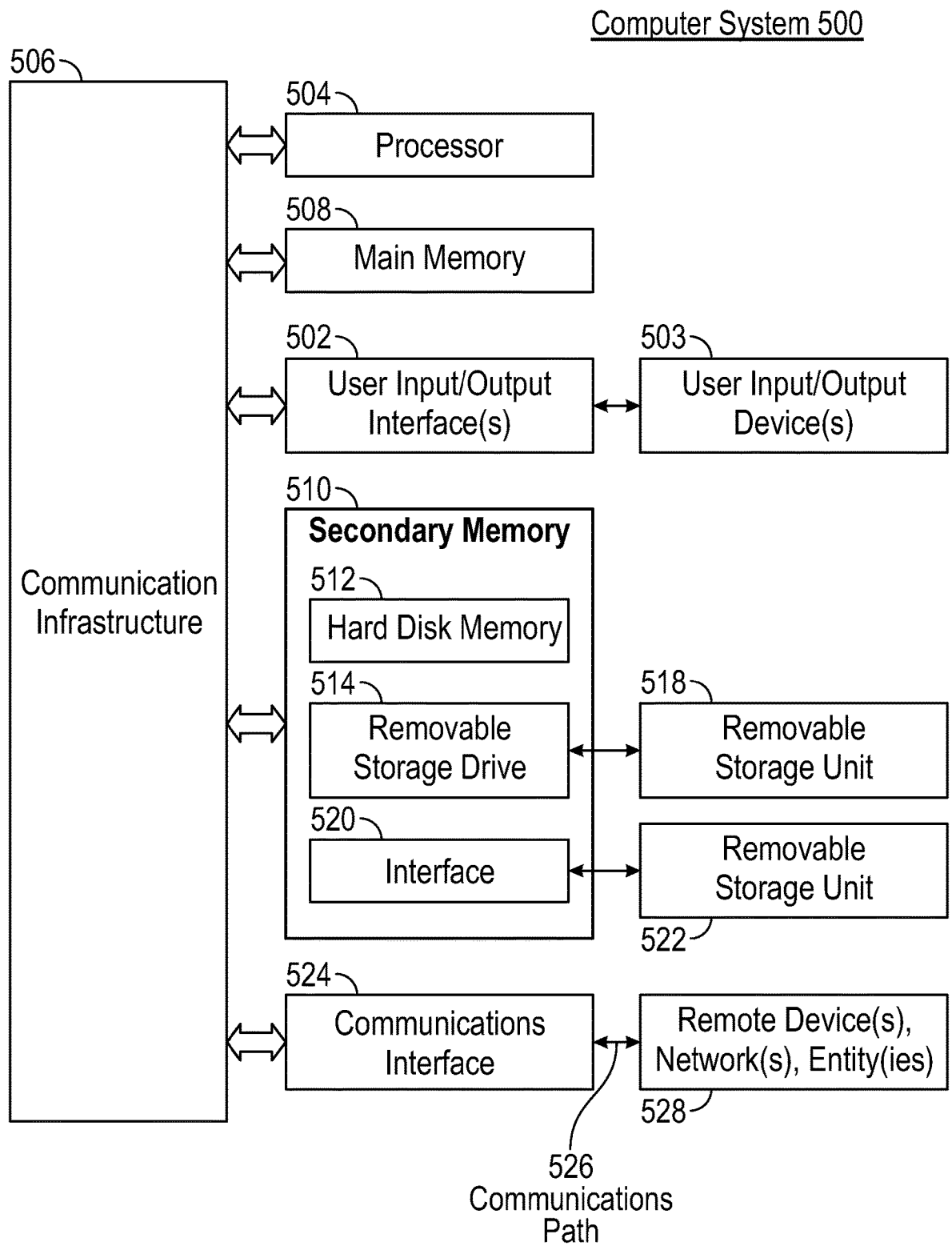
FIG. 3 illustrates an example computer system architecture for implementing the claimed systems and methods.
Figure 4:
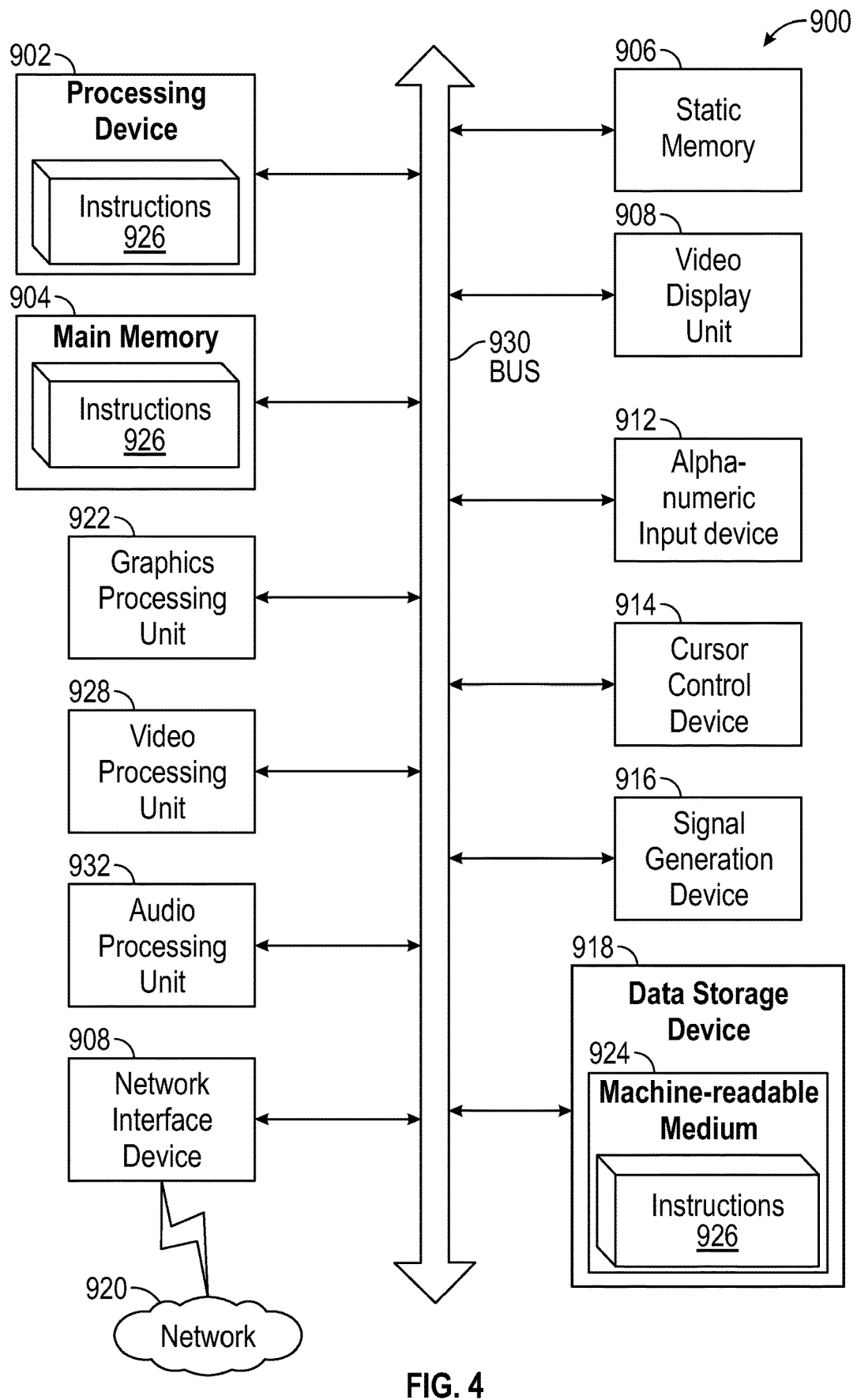
FIG. 4 illustrates further details of an example computer system architecture for implementing the claimed systems and methods.

FIGS. 3 and 4 depict example computer systems useful for implementing various embodiments described in the present disclosure. Various embodiments may be implemented, for example, using one or more computer systems, such as computer system 500 shown in FIG. 3. One or more computer system(s) 500 may be used, for example, to implement any of the embodiments discussed herein, as well as combinations and sub-combinations thereof.

Computer system 500 may include one or more processors (also called central processing units, processing devices, or CPUs), such as a processor 504. Processor 504 may be connected to a communication infrastructure 506 (e.g., such as a bus).

Computer system 500 may also include user input/output device(s) 503, such as monitors, keyboards, pointing devices, etc., which may communicate with communication infrastructure 506 through user input/output interface(s) 502. One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main memory 508, such as random-access memory (RAM). Main memory 508 may include one or more levels of cache. Main memory 508 may have stored therein control logic (i.e., computer software, instructions, etc.) and/or data. Computer system 500 may also include one or more secondary storage devices or secondary memory 510. Secondary memory 510 may include, for example, a hard disk drive 512 and/or a removable storage device or removable storage drive 514. Removable storage drive 514 may interact with a removable storage unit 518. Removable storage unit 518 may include a computer-usable or readable storage device having stored thereon computer software (control logic) and/or data. Removable storage drive 514 may read from and/or write to removable storage unit 518.

Secondary memory 510 may include other means, devices, components, instrumentalities, or other approaches for allowing computer programs and/or other instructions and/or data to be accessed by computer system 500. Such means, devices, components, instrumentalities, or other approaches may include, for example, a removable storage unit 522 and an interface 520. Examples of the removable storage unit 522 and the interface 520 may include a program cartridge and cartridge interface, a removable memory chip (such as an EPROM or PROM) and associated socket, a memory stick and USB port, a memory card and associated memory card slot, and/or any other removable storage unit and associated interface.

Computer system 500 may further include communications interface 524 (e.g., network interface). Communications interface 524 may enable computer system 500 to communicate and interact with any combination of external devices, external networks, external entities, etc. (individually and collectively referenced as remote device(s), network(s), entity(ies) 528). For example, communications interface 524 may allow computer system 500 to communicate with external or remote device(s), network(s), entity(ies) 528 over communications path 526, which may be wired and/or wireless (or a combination thereof), and which may include any combination of LANs, WANs, the Internet, etc. Control logic and/or data may be transmitted to and from computer system 500 via communications path 526.

Computer system 500 may also be any of a personal digital assistant (PDA), desktop workstation, laptop or notebook computer, netbook, tablet, smartphone, smartwatch or other wearable devices, appliance, part of the Internet-of-Things, and/or embedded system, to name a few non-limiting examples, or any combination thereof.

Computer system 500 may be a client or server computing device, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

FIG. 4 illustrates an example machine of a computer system 900 within which a set of instructions, for causing the machine to perform any one or more of the operations discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, a specialized application or network security appliance or device, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random-access memory (DRAM) such as synchronous DRAM (SDRAM), etc.), a static memory 906 (e.g., flash memory, static random-access memory (SRAM), etc.), and a data storage device 918, which communicate with each other via a bus 930.

Processing device 902 represents one or more processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application-specific integrated circuit (ASIC), a field-programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910, an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable medium 924 (also known as a computer-readable storage medium) on which is stored one or more sets of instructions 926 (e.g., software instructions) embodying any one or more of the operations described herein. The instructions 926 may also reside, completely or at least partially, within the main memory 904 and/or within the processing device 902 during execution thereof by the computer system 900, where the main memory 904 and the processing device 902 also constitute machine-readable storage media.

In an example, the instructions 926 include instructions to implement operations and functionality corresponding to the disclosed subject matter. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions 926. The term "machine-readable storage medium" shall also be taken to include any medium that is capable of storing or encoding a set of instructions 926 for execution by the machine and that cause the machine to perform any one or more of the operations of the present disclosure. The term "machine-readable storage medium" shall accordingly be taken to include, but is not be limited to, solid-state memories, optical media, and magnetic media.

Some portions of the detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The operations and illustrations presented herein are not inherently related to any particular computer or other apparatus. Various types of systems may be used with programs in accordance with the teachings herein, or it may prove convenient to construct a more specialized apparatus to perform the operations. The structure for a variety of these systems will appear as set forth in the description herein. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIGS. 3 and 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents. In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

The invention claimed is:

1. A computerized method for securing a set of executable instructions by obfuscation, the method comprising:
receiving a set of non-obfuscated executable instructions corresponding to a program whose input comprises a value in the set $\{1, \ldots, N\}$;
using a functional encoding primitive comprising an encoding process, an opening process and a decoding process to compute obfuscated instructions by:
executing the encoding process of the functional encoding primitive to encode the executable instructions;
executing the opening process;
storing outputs of the encoding process and the opening process as a set of obfuscated instructions; and
storing the set of obfuscated executable instructions on a computerized storage device for subsequent execution, wherein the set of obfuscated executable instructions satisfy properties of:
functionality, whereby the set of obfuscated executable instructions and the set of non-obfuscated executable instructions compute the same function and have the same input-output behavior; and
security, whereby for any two sets of non-obfuscated executable instructions with the same input-output behavior of the set of non-obfuscated executable instructions, the corresponding set of obfuscated executable instructions cannot be distinguished by a computationally efficient process;
wherein the functional encoding primitive further comprises a commitment primitive and a sampler primitive;
the commitment primitive further comprises a commit process, an evaluation process, and an open process;
the sampler primitive further comprises an initialize process and a sample process;
commit, evaluation, and open processes of the commitment primitive use a learning with errors sample plus a committed value to generate an opening for an evaluated commitment smaller than the committed value; and
the initialization and sampling processes of the sampler primitive further comprise:
initializing by executing a commitment process on a key k for a pseudorandom function resulting in a commitment c; and
sampling by executing a commitment evaluation process to generate a pseudorandom learning with errors sample from the key k.

2. The method of claim 1, further comprising executing the obfuscated instructions of a program on an input x in the set $\{1, \ldots, N\}$ by:
finding an index/in $\{1, \ldots, Q\}$ of a function that corresponds to an evaluation of the program on x; and
executing a decoding process on the obfuscated executable instructions and the $i^{th}$ opening to recover an output of de-obfuscated instructions.

3. The method of claim 1,
wherein the encode, open, decode processes of the functional encoding primitive further comprise:
encoding by:
executing the commitment process;
executing the sampler initialization process;
opening by:
executing the commitment evaluation process;
executing a sampling process of the sampler;
summing up the sample and the evaluated commitment resulting in a commitment c;
providing an opening for the commitment c;
decoding by:
executing a commitment evaluation process;
executing a sampling process of the sampler;
summing up the sample and the evaluated commitment resulting in a commitment c; and
using the provided opening for c to recover a committed value.

4. The method of claim 1, further comprising computing Q=sqrt(N) functions, each of which functions corresponds to evaluating the executable instructions on a set of m=sqrt(N) distinct input values; and executing the opening process for each of the functions.

5. The method of claim 1, wherein the obfuscated instructions represent a proprietary algorithm for providing a security function in a mobile hardware environment, and further comprising distributing the stored obfuscated instructions to a remote platform comprising the mobile hardware environment.

6. The method of claim 5, wherein the mobile hardware environment comprises a secure coprocessor that further comprises a hardware-based key manager, which is isolated from a main processor for the mobile hardware environment.

7. The method of claim 5, wherein the obfuscated instructions represent one or more components of an operating system for the mobile hardware environment.

8. The method of claim 5, wherein the obfuscated instructions perform a function of verifying one or more of components of an operating system for the mobile hardware environment.

9. The method of claim 5, wherein the obfuscated instructions represent one or more application programming interfaces which are exposed for outside access.

10. The method of claim 1, further comprising combining multiple instances of the obfuscation process together using a tree-like compression process to create an obfuscated program, wherein execution of the obfuscated program on a computerized processor runs in polynomial time.

11. A computerized system for securing a set of executable instructions by obfuscation, the system comprising:
a computerized processor configured for:
receiving a set of non-obfuscated executable instructions corresponding to a program whose input comprises a value in the set $\{1, \ldots, N\}$;
using a functional encoding primitive comprising an encoding process, an opening process and a decoding process to compute obfuscated instructions by:
executing the encoding process of the functional encoding primitive to encode the executable instructions;
executing the opening process;
storing outputs of the encoding process and the opening process as a set of obfuscated instructions; and
a data store configured for storing the set of obfuscated executable instructions on a computerized storage device for subsequent execution, wherein the set of obfuscated executable instructions satisfy properties of:
functionality, whereby the set of obfuscated executable instructions and the set of non-obfuscated executable instructions compute the same function and have the same input-output behavior; and
security, whereby for any two sets of non-obfuscated executable instructions with the same input-output behavior of the set of non-obfuscated executable instructions, the corresponding set of obfuscated executable instructions cannot be distinguished by a computationally efficient process;
wherein the functional encoding primitive further comprises a commitment primitive and a sampler primitive;
the commitment primitive further comprises a commit process, an evaluation process, and an open process;
the sampler primitive further comprises an initialize process and a sample process;

commit, evaluation, and open processes of the commitment primitive use a learning with errors sample plus a committed value to generate an opening for an evaluated commitment smaller than the committed value; and the initialization and sampling processes of the sampler primitive further comprise:
initializing by executing a commitment process on a key k for a pseudorandom function resulting in a commitment c; and
sampling by executing a commitment evaluation process to generate a pseudorandom learning with errors sample from the key k.

12. The system of claim 11, further comprising executing the obfuscated instructions of a program on an input x in the set $\{1, \ldots, N\}$ by:
finding an index i in $\{1, \ldots, Q\}$ of a function that corresponds to an evaluation of the program on x; and
executing a decoding process on the obfuscated executable instructions and the $i^{th}$ opening to recover an output of de-obfuscated instructions.

13. The system of claim 11,
wherein the encode, open, decode processes of the functional encoding primitive further comprise:
encoding by:
executing a commitment process;
executing a sampler initialization process;
opening by:
executing a commitment evaluation process;
executing a sampling process of the sampler;
summing up the sample and the evaluated commitment resulting in a commitment c;
providing an opening for the commitment c;
decoding by:
executing a commitment evaluation process;
executing a sampling process of the sampler;
summing up the sample and the evaluated commitment resulting in a commitment c; and
using the provided opening for c to recover a committed value.

14. The method of claim 1, further comprising computing Q=sqrt(N) functions, each of which functions corresponds to evaluating the executable instructions on a set of m=sqrt(N) distinct input values; and executing the opening process for each of the functions.

15. The system of claim 11, wherein the obfuscated instructions represent a proprietary algorithm for providing a security function in a mobile hardware environment, and further comprising distributing the stored obfuscated instructions to a remote platform comprising the mobile hardware environment.

16. The system of claim 15, wherein the obfuscated instructions represent one or more components of an operating system for the mobile hardware environment.

17. The system of claim 15, wherein the obfuscated instructions perform a function of verifying one or more of components of an operating system for the mobile hardware environment.

18. The system of claim 11, further comprising combining multiple instances of the obfuscation process together using a tree-like compression process to create an obfuscated program, wherein execution of the obfuscated program on a computerized processor runs in polynomial time.

* * * * *